Patented May 31, 1949

2,471,455

UNITED STATES PATENT OFFICE 2,471,455

PREPARATION OF TERPENE PHENOLS

Alfred L. Rummelsburg, Wilmington, Del., assignor to Hercules Powder Company, Wilmington, Del., a corporation of Delaware No Drawing. Application November 7, 1944, Serial No. 562,380

3 Claims. (Cl. 260—62)

This invention relates to terpene-substituted phenols prepared by the condensation of cyclic terpenes with phenols.

It is well known that a terpene may be reacted with a phenol in the presence of a catalyst. Various catalysts have been used to bring about such a reaction, for example, inorganic acids such as sulfuric acid and phosphoric acid, organic acids such as p-toluene sulfonic acid or metal halides such as aluminium chloride, zinc chloride and stannic chloride. When these catalysts are used, the products formed are substantially terpene phenyl ethers which in some instances contain relatively small amounts of terpene mono- and diphenols. Terpene-substituted phenols have been formed by reacting a terpene halide with a phenol in the presence of a metal halide. However, this method has the disadvantage that a terpene halide must be used as a starting material.

Now in accordance with this invention it has been found that terpene-substituted phenols may be formed by the condensation of a cyclic terpene with a phenol in the presence of boron trifluoride. The product resulting from this process consists essentially of a terpene-substituted phenol which in some cases is a polyterpene-polyphenol.

The following examples are illustrative of the preparation of these terpene-substituted phenols in accordance with this invention. All parts and percentages given in the examples represent parts and percentages by weight.

Example I

Two hundred seventy-two parts of a mixture of terpenes containing about 45% dipentene, 40% terpinolene, and similar monocyclic terpenes and about 15% cymene-menthane mixture were slowly added during a period of 0.5 hour to an agitated solution of 16 parts of boron trifluoride in a mixture of 270 parts of phenol and 135 parts of benzene, and held at a temperature between about 10° C. and about 20° C. The viscosity of the mixture increased rapidly, whereupon an additional 100 parts of benzene were added. The mixture was agitated for one hour at a temperature between about 20 C. and about 30° C., at the end of which time 370 parts of the mixture were removed and washed with hot water to remove the catalyst. The solvent and unreacted constituents in this portion of the mixture were then removed by means of a vacuum distillation operation at a pressure of 15 mm. of mercury, using a final bath temperature of about 170° C. to produce 172 parts of a resinous product having a melting point of 92° C., a color of G on the Rosin color scale, a hydroxyl content of 7.0% (Zerewitinoff) and a molecular weight of about 330 (Rast).

This product was distilled at 1 mm. pressure, using a final bath temperature of 240° C. A distillate of about 20% of the material was obtained which was a liquid and had a hydroxyl content of 5.4% and a molecular weight of 232. The distillation residue comprised about 80% of the material and had a melting point of 117° C., a hydroxyl content of 7.6% and a molecular weight of 396.

The remainder of the reaction mixture was agitated at a temperature of about 20° C. to about 30° C. for an additional 3½ hours, and then washed with water to remove the catalyst and worked up as previously described. A yield of 202 parts of a resinous material was produced having a melting point of 94° C., a color of F on the Rosin color scale, a hydroxyl content of 7.0%, and a molecular weight of about 350 (Rast).

Example II

One hundred thirty-seven parts of alpha-pinene were added during 0.5 hour to an agitated solution of 7 parts of boron trifluoride in a mixture of 135 parts of phenol and 100 parts of benzene and held at a temperature of about 10° C. to about 20° C. Agitation was continued at this temperature for 2 hours. The resulting reaction mixture was washed with water to remove the catalyst. The unreacted constituents and solvent were removed by means of vacuum distillation at a pressure of 15 mm. of mercury using a final bath temperature of about 170 C. to about 190° C. to produce a 74% yield on a terpene basis of a resinous product having a melting point of about 83° C., a color of D on the Rosin color scale, and a hydroxyl content of 6.5%.

Example III

Example II was repeated except that the alpha-pinene was replaced with a by-product terpene mixture which contained about 40% of cineols. An 87% yield of a resinous product was obtained, on the basis of the by-product terpene mixture, which had a melting point of 100° C., a color of F on the Rosin color scale and a hydroxyl content of 7.3%.

Example IV

One hundred thirty-seven parts of beta-pinene were added during 0.5 hour to an agitated solution of 13.5 parts of boron trifluoride in a mixture, of 90 parts of cyclohexane and 135 parts of phenol, the temperature being held between about 18° C.

and about 25° C. The batch was then agitated at a temperature of between about 25 C. to about 30° C. for 2 hours. The reaction mixture was worked up as described in Example II. A 90% yield of a resinous product was obtained having a melting point of 94° C., a color of F+ on the Rosin color scale, and a hydroxyl content of 5.4%.

*Example V*

One hundred seven parts of a mixture of terpenes containing about 45% dipentene, 40% terpinolene and similar monocyclic terpenes, and about 15% of a cymene-menthane mixture were added during 1.5 hours to an agitated solution of 6 parts of boron trifluoride in a mixture of 100 parts of commercial cresols and 50 parts of benzene, the temperature being held at about 10° C. to about 20° C. The batch was then agitated at a temperature of about 25° C. to about 30° C. for 2.5 hours. The mass was washed with water to remove the catalyst and then was worked up as described in Example II. A yield of 160 parts of a resinous product having a melting point of 87° C. and a color of K on the Rosin color scale was obtained. The product had a molecular weight of 327 and a hydroxyl content of 7.3%.

*Example VI*

Fifty parts of boron trifluoride were dissolved in a solution of 1215 parts of phenol in 675 parts of benzene. A mixture of 1215 parts of camphene and 150 parts of benzene was then added during two hours to this agitated solution, the temperature being held at about 20° C. to about 30° C. Agitation was continued for 2.5 hours at 20° C. to 30° C. The reaction mixture was further diluted with 500 parts of benzene and then was washed with water to remove the catalyst. The solvent and unreacted constituents were removed by vacuum distillation at a pressure of 20 mm. of mercury, using a final bath temperature of 190° C. A yield of 1815 parts of a soft resinous product which had a color of X on the Rosin color scale was obtained.

One hundred parts of the above resin were subjected to vacuum distillation at 1 mm. pressure. About 54 parts of a volatile portion distilled over at a vapor temperature of 146° C. to 171° C. The distillate on cooling was a pale liquid which had a hydroxyl content of 7.1% and a molecular weight of 224. Forty-six parts of a solid non-volatile residue remained from the above distillation. This solid resin had a melting point of 71° C., a hydroxyl content of 5.1%, and a molecular weight of 418.

In the above examples, the hydroxyl content of the products was determined using the Zerewitinoff method, the molecular weight of the products was determined by the Rast method and the melting points were determined by the Hercules Drop method.

The condensation reaction between the cyclic terpene and the phenol is preferably carried out by absorbing gaseous boron trifluoride in the phenol to be reacted with the terpene, desirably in the presence of an inert solvent, in order to reduce the viscosity of the reaction mixture, after which the terpene is added during a suitable period with agitation, while controlling the temperature by external means, and while controlling the rate of addition of terpene. After adding the terpene, the homogeneous mixture is agitated for another suitable period of time to complete the reaction between the terpene and the phenol. The catalyst is then removed by water-washing, or by other means, and the reaction mixture is subjected to steam and/or vacuum distillation in order to remove the solvent and unreacted constituents, leaving the condensate which consists essentially of a terpene-substituted phenol as a residue.

If desired the terpene and phenol to be reacted in accordance with this invention may be mixed together, desirably in the presence of an inert solvent, and then the boron trifluoride introduced into the mixture. However, this procedure is less desirable than when the terpene is added to the boron fluoride-treated phenol as previously described, since it is more difficult to control the temperature of the reaction when the boron trifluoride is added to the terpene-phenol mixture.

In carrying out the condensation reaction between a cyclic terpene and a phenol to form the terpene-substituted phenols of this invention, it is usually desirable to employ at least one mole of phenol for each mole of cyclic terpene. However, an excess of either terpene or phenol may be used; preferably about 0.75 to about 2 moles of phenol are used for each mole of terpene.

The reaction temperature that may be employed in reacting a cyclic terpene with a phenol to form the terpene-substituted phenols of this invention may range from about −10° C. to about 150° C., and the temperature range is preferably from about 5° C. to about 70° C. The reaction period may range from about 0.5 to about 24 hours and is preferably from about 1 hour to about 8 hours. It has been found that these temperature conditions and these time conditions are most suitable for insuring the condensation of the terpene with the phenol to produce resinous terpene-substituted phenols, some of which comprise the condensates of at least two molecules of a cyclic terpene having an empirical formula of $C_{10}H_{16}$ with the same number of molecules of phenol to form a resin that may be conveniently referred to as being a resinous polyterpene-polyphenol.

The catalyst is desirably removed from the reaction mixture by washing the reaction mixture with water at a temperature desirably between about 20° C. and about 100° C. The use of water at an elevated temperature favors the decomposition of the boron trifluoride reaction complex, and hence facilitates the removal of the boron trifluoride.

The quantity of catalyst that may be used in catalyzing the reaction between the cyclic terpene and the phenol to produce the terpene-substituted phenols of this invention may vary from about 0.2% to about 25% of the weight of the reaction mixture and preferably from about 1% to about 6%. The reaction mixture includes the solvents used as well as the terpene and the phenol components.

In order to produce the terpene-substituted phenols of the present invention, it is essential that the catalyst be boron trifluoride. It has been discovered that other catalysts such as aluminum chloride, zinc chloride, stannic chloride, inorganic acids such as sulfuric acid, phosphoric acid, hydrogen chloride, and organic sulfonic acids such as para-toluene sulfonic acid will not produce the results produced when boron trifluoride is used as the catalyst. Catalysts other than boron trifluoride form condensates with a terpene and a phenol, which condensates are mixtures of terpene-phenyl ethers ranging from about 40% to about 80% and monoterpene-monophenols, whereas the use of boron trifluoride as a catalyst produces condensates which are substantially entirely the terpene-substituted phenols of the present invention.

Phenols which may be employed in the present invention, using any terpene and using the conditions of temperature and time hereinbefore set forth, are any chemical substance having a phenolic characteristic, as for example, phenol, tar acids, cresols, xylenols, alkyl-, aralkyl- and aryl-substituted phenols such as p-tertiary butyl phenol, p-tertiary amyl phenol, p-phenyl phenol, ortho- and para-cyclohexyl phenol, monochloro phenols, nitro phenols, naphthols, dihydroxy benzenes such as pyrocatechol and resorcinol, dihydroxy naphthalenes, dihydroxy anthracenes, dihydroxy diphenyls, 2,2-bis(p-hydroxyphenyl)propane, and alkoxy phenols such as guaiacol, etc.

Substantially inert solvents, such as benzene, toluene, xylene, cyclohexane, para-menthane, para-cymene, carbon tetrachloride, ethylene dichloride, etc., may be used during the condensation reaction in order to reduce the viscosity of the reaction mixture and facilitate satisfactory mixing of the components.

Generally the unsaturated cyclic terpene hydrocarbons are useful in accordance with this invention. The terpene hydrocarbons may be conveniently referred to as those cyclic terpene hydrocarbons having an empirical formula of $C_{10}H_{16}$. Suitable monocyclic terpenes are dipentene, terpinolene, alpha-terpinene, beta-terpinene, gamma-terpinene, alpha-phellandrene, beta-phellandrene, limonene, crithmene, 2,4(8)-menthadiene, 2,4(5)-menthadiene, 2,5-menthadiene, 3,8-menthadiene and 2,8-menthadiene. The bicyclic terpenes containing one double bond which readily isomerize to terpenes containing two double bonds are also operable in accordance with this invention and typical examples are alpha-pinene, beta-pinene, carenes, and thujenes. Bicyclic terpenes containing one double bond such as camphene, bornylene, alpha-fenchene, beta-fenchene, gamma-fenchene, etc., which do not isomerize to mono-cyclic terpenes containing two double bonds may be used in which case the product is a bornyl-, isobornyl-, etc., substituted phenol. Mixtures of the various cyclic terpenes may also be used.

After the condensation has been completed between the cyclic terpene and a phenol in the presence of boron fluoride as a catalyst, and the catalyst has been removed, the resulting mixture may be subjected to steam and/or vacuum distillation in order to remove small amounts of unreacted products and solvents. If desired, the condensate which remains after removal of solvent and unreacted constituents can be further distilled at pressures of 30 mm., or less, whereby the volatile terpene-substituted phenols are removed. For example, in general the condensates from both bicyclic tempenes which readily isomerize to monocyclic terpenes and monocyclic terpenes can be subjected to low pressure distillation which will remove part of the volatile liquid terpene-substituted phenols and increase the concentration of solid non-volatile polyterpene-polyphenols in the residue. The chemical structure of the polyterpene-polyphenols is not known, but they are believed to consist of diterpene-diphenols. The condensates from bicyclic terpenes which do not isomerize to monocyclic terpenes can also be subjected to distillation to remove volatile terpene-substituted phenols and obtain a solid residue which usually consists of diterpene-phenols. For example, the condensate of camphene and phenol can be separated by distillation into a volatile liquid monoisobornyl-phenol, and a solid nonvolatile product which is substantially a diisobornyl-phenol.

The terpene-substituted phenols which are obtained in accordance with the process of this invention range in color from about D to about X on the Rosin color scale. The products which are dark in color may be refined in solution, using such solvents as benzene and toluene, with adsorbents such as fuller's earth, bauxite, activated carbon, natural and synthetic magnesium silicates to produce high yields of resinous product, having a much lighter color. The efficiency of the adsorbents is improved by calcination of them at temperatures of 200° C. to 500° C. prior to their use.

The resins of this invention may be used as such or may be reacted with aldehydes to form other resins useful in the manufacture of varnishes, etc. They are also useful in the preparation of insecticides, germicides, and as chemical intermediates.

What I claim and desire to protect by Letters Patent is:

1. The process of preparing a terpene-substituted phenol which comprises reacting about equal parts by weight of (a) a terpene mixture containing about 45% dipentene, about 40% terpinolene, and similar monocyclic terpenes and about 15% cymene and menthane and (b) a phenolic material selected from the group consisting of phenol and commercial cresols for about 1 to 8 hours at a temperature within the range of about 10° C. and about 30° C. in the presence of boron trifluoride as a catalyst.

2. The process of claim 1 in which the phenolic material is phenol.

3. The process of claim 1 in which the phenolic material is commercial cresols.

ALFRED L. RUMMELSBURG.

REFERENCES CITED

The following references are of record in the file of this patent:

UNITED STATES PATENTS

| Number | Name | Date |
|---|---|---|
| 1,469,709 | Wuyts | Oct. 2, 1923 |
| 2,129,153 | Schirm | Sept. 6, 1938 |
| 2,273,100 | Gleason | Feb. 17, 1942 |

FOREIGN PATENTS

| Number | Country | Date |
|---|---|---|
| 609,477 | Germany | June 3, 1935 |